United States Patent
Hutchings et al.

(10) Patent No.: US 9,088,818 B2
(45) Date of Patent: Jul. 21, 2015

(54) ADAPTIVE MEDIA DELAY MATCHING

(75) Inventors: Jeffrey L. Hutchings, Lehi, UT (US);
Aaron Gelter, West Jordan, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 315 days.

(21) Appl. No.: 13/165,475

(22) Filed: Jun. 21, 2011

(65) Prior Publication Data
US 2012/0327300 A1 Dec. 27, 2012

(51) Int. Cl.
*H04N 21/43* (2011.01)
*H04N 21/426* (2011.01)

(52) U.S. Cl.
CPC ..... *H04N 21/4307* (2013.01); *H04N 21/42607* (2013.01)

(58) Field of Classification Search
CPC .................. H04N 21/2368; H04N 21/44008
See application file for complete search history.

(56) References Cited

U.S. PATENT DOCUMENTS

| | | | |
|---|---|---|---|
| 4,313,135 A | 1/1982 | Cooper | 358/149 |
| 4,703,355 A * | 10/1987 | Cooper | 348/512 |
| RE33,535 E | 2/1991 | Cooper | 358/149 |
| 5,202,761 A | 4/1993 | Cooper | 358/149 |
| 5,530,483 A | 6/1996 | Cooper et al. | 348/518 |
| 5,751,368 A | 5/1998 | Cooper | 348/512 |
| 5,768,280 A * | 6/1998 | Way | 370/486 |
| 7,693,190 B2 * | 4/2010 | Firestone et al. | 370/503 |
| 2002/0178277 A1 * | 11/2002 | Laksono | 709/231 |
| 2006/0168612 A1 * | 7/2006 | Chapman et al. | 725/11 |
| 2008/0013512 A1 | 1/2008 | Yurugi | 370/338 |

OTHER PUBLICATIONS

AD2100 Stereo Audio Delay/Synchronizer, downloaded Jun. 16, 2011, pp. 1-2, available at www.pixelinstruments.tv/ad2100.htm.
DD2100 Video Delay Detector, downloaded Jun. 16, 2011, pp. 1-2, available at www.pixelinstruments.tv/dd2100.htm.
European Search Report, dated Oct. 8, 2012, pp. 1-6, European Patent Application No. 12172970.1, European Patent Office, Berlin, Germany.

* cited by examiner

*Primary Examiner* — Michael Teitelbaum
(74) *Attorney, Agent, or Firm* — Alleman Hall McCoy Russell & Tuttle LLP

(57) ABSTRACT

A system may be provided for synchronizing a first media stream with a second media stream. A first receiver in the system may receive the first media stream over a network. A second receiver in the system may receive the second media stream over the network. The second receiver may determine an identity of a content delay matching stream that indicates the amount of processing delay introduced in the first media stream by a processing component of the first receiver or transmitter. The second receiver may subscribe to the identified content delay matching stream. The second receiver may receive the content delay matching stream over the network and determine the processing delay from the content delay matching stream. The receiver may cause the second media stream to be delayed in accordance with the processing delay in the first media stream such that the first and second media streams are synchronized.

19 Claims, 3 Drawing Sheets

ADAPTIVE MEDIA DELAY MATCHING

BACKGROUND OF THE INVENTION

1. Technical Field

This application relates to media streams and, in particular, to delays resulting in processing media streams.

2. Related Art

A transmitter may encapsulate audio/video media streams into packets and transmit the packets over a network to one or more receivers. The receivers may recover audio/video media streams from the packets. A first media stream recovered at a first receiver may not be time aligned with a second media stream recovered at a second receiver due to processing delays in the first media stream introduced in the first receiver, the transmitter, or a combination thereof.

SUMMARY

A system is provided for synchronizing a first media stream with a second media stream, such as synchronizing a video media stream with an audio media stream. A first receiver, such as a video stream receiver, may receive the first media stream in packets transmitted over a network. A second receiver, such as an audio stream receiver, may receive the second media stream in packets transmitted over the network. The packetized media streams may be Audio/Video Bridging Transport Protocol (AVBTP) streams, multicast streams, or any other type of stream. The second receiver may determine an identity of a content delay matching stream (CDMS). The CDMS may indicate in real-time what processing delay is imposed on the first media stream by a processing component, such as a video frame synchronizer in the first receiver. The processing delay, and consequently, the indication of the processing delay in the CDMS may vary over time. The second receiver may subscribe to and receive the CDMS from the first receiver, such as over the network. The second receiver may determine the processing delay from the CDMS. Accordingly, the second receiver may delay the second media stream in accordance with the actual processing delays imposed on the first media stream. As a result, the first media stream and the second media stream may be synchronized despite the processing delays introduced to the first media stream.

One interesting aspect is that the CDMS may indicate what processing delay a transmitter of the first media stream introduces to the first media stream. The first receiver may determine the processing delay of the transmitter from a second CDMS received over the network by the first receiver from the transmitter.

A further interesting aspect is that the second receiver may determine the identity of the CDMS from a logical grouping of the first receiver and the second receiver. Due to the logical grouping of the receivers, streams received by the first receiver may be synchronized with streams received by the second receiver based on the content delay matching stream (CDMS) received by the second receiver from the first receiver. The logical grouping may be reconfigured manually or programmatically.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

By way of example, a system may be provided for matching a delay between a first media stream and a second media stream, such as between a video stream and an audio stream. A first receiver, such as a video stream receiver, may receive the first media stream in packets transmitted over a network. A second receiver, such as an audio stream receiver, may receive the second media stream in packets transmitted over the network. The packetized media streams may be Audio/Video Bridging Transport Protocol (AVBTP) streams, for example. The second receiver may determine an identity of a content delay matching stream (CDMS). The CDMS may indicate in real-time what processing delay the first receiver adds to the first media stream due to processing the first media stream. Alternatively or in addition, the CDMS may indicate what processing delay a transmitter of the first media stream introduces to the first media stream. The processing delay indicated in the CDMS may vary over time. The second receiver may subscribe to and receive the CDMS over the network. The second receiver may determine the processing delay from the CDMS. Accordingly, the second receiver may delay the second media stream in accordance with the actual processing delays affecting the first media stream. As a result, independent processing of the first media stream and the second media stream by the respective first and second receivers may result in the first and second media streams being aligned despite the processing delays imposed on the first media stream.

In one interesting aspect, the system may facilitate creating a logical grouping that includes the first and second receivers. The receiver that introduces a processing delay to one of the media streams may transmit the CDMS to the other receiver(s) in the logical grouping. Accordingly, the receivers in the logical grouping may compensate for the processing delays introduced by any of the receivers in the logical grouping. As the receivers in the logical grouping receive new and/or different media streams, the media streams may remain aligned or synchronized. Accordingly, the system for matching delays in the media streams caused by processing of the media streams may provide a distributed and adaptive delay matching solution for media synchronization. The system may enable various media sources and sinks, such as the transmitters and the receivers, respectively, to compensate in real-time for variations between the media sources and sinks. The receivers may transmit and track real-time delay variations caused by delays in media streams paths in, for example, an IEEE (Institute of Electrical and Electronics Engineers) P1722 bridged local area network.

Figure 1:
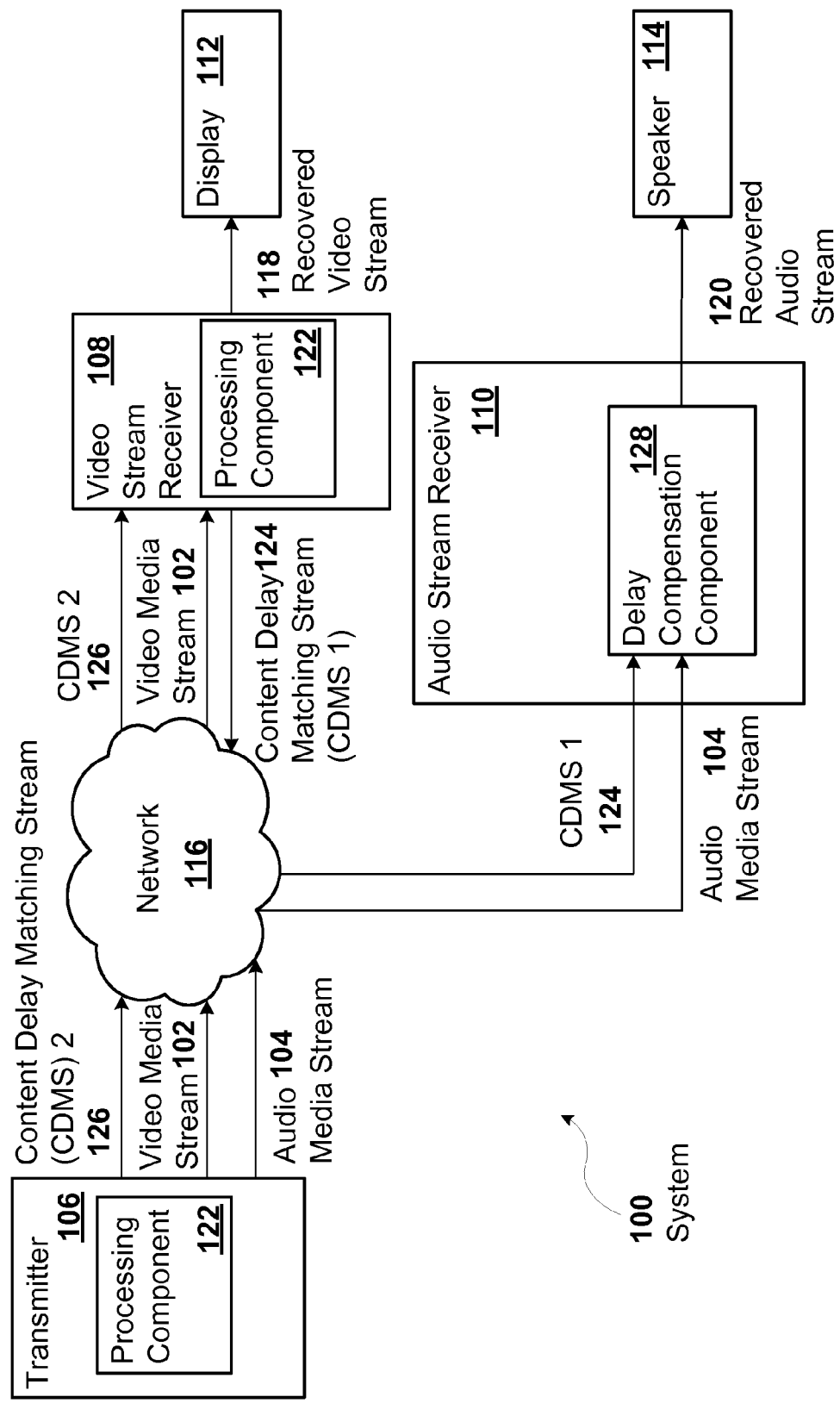
FIG. 1 illustrates an example of a system for matching a delay between a first media stream and a second media stream.

FIG. 1 illustrates an example of a system 100 for matching a delay between a first media stream, such as a video media stream 102, and a second media stream, such as an audio media stream 104. The system 100 may include a transmitter 106 and two or more receivers, such as a video stream receiver 108 and an audio stream receiver 110.

The system 100 may include additional, different, or fewer components. For example, the system 100 may include a display 112, a speaker 114, or any other output device. The system 100 may include multiple transmitters 106.

The transmitter 106 may include a component that transmits one or more of the media streams 102 and 104 over a network 116 to one or more of the receivers 108 and 110. In the example illustrated in FIG. 1, the transmitter 106 transmits the video media stream 102 to the video stream receiver 108 and the audio media stream 104 to the audio stream receiver 110. Examples of the transmitter 106 include a circuit, an application specific integrated circuit (ASIC), a field programmable gate array (FPGA), a computer, a networking card, an audio digital signal processor, a video signal processor, a multi-media device, such as a networked DVD (Digital Video Disc) player that transmits an audio/video stream, or other device.

Each of the receivers 108 and 110 may include a component that independently receives one or more of the media streams 102 or 104 from the transmitter 106. Examples of the receivers 108 and 110 include a circuit, an application specific integrated circuit (ASIC), a field programmable gate array (FPGA), a computer, a networking card, an audio digital signal processor, a video signal processor, an amplifier, a multimedia device, such as a networked video receiver configured to receive a video stream with multi-channel audio, or other device. Each of the receivers 108 and 110 may include a component that generates a recovered stream, such as a recovered video stream 118 or a recovered audio stream 120, independently of the other receivers 108 and 110.

The network 116 may be any communications network. For example, the network 116 may include any packet-based or any packet-switched network, such as a local area network (LAN), a wireless local area network (WLAN), a personal area network (PAN), a wide area network (WAN), the Internet, or a combination thereof. Alternatively or in addition, the network 116 may include any communication channel, such as an internal bus, that may transport packets from one device to another. The packets may include time-stamped packets encapsulating the media streams 102 and 104. The packets of the media streams 102 and 104 may include media stream samples of audio, video, some other type of media, or any combination thereof.

In addition, the packets of the media streams 102 and 104 may include timestamps. For example, the timestamps may be presentation times based on values of a real-time clock at the transmitter 106. The real-time clock at the transmitter 106 may be synchronized with a real-time clock at each one of the receivers 108 and 110. Each of the timestamps may include a value of the real-time clock at the transmitter 106 sampled at the transmitter 106. A presentation time, for example, may be the value of the real-time clock plus an estimated network propagation delay. Examples of mechanisms for transmitting the media streams 102 and 104 encapsulated in time-stamped packets to the receivers 108 and 110 and recovering the media streams 102 and 104 at the receivers 108 and 110 based on the real-time clocks is described in U.S. application Ser. No. 13/024,016, "MEDIA EXTRACTOR" filed Feb. 9, 2011. The mechanisms for recovering the media streams 102 and 104 at the receivers 108 may synchronize the media streams 102 and 104 at the receivers 108 and 110 despite propagation delays in the network 116.

During operation of the system 100, the audio media stream 104 may be time-synchronized to the video media stream 102 in order to compensate for network propagation delays as described above. Accordingly, the audio and video media streams 102 and 104 may be synchronized as the media streams 102 and 104 are transmitted by the transmitter 106. For example, if the network 116 is a CLASS A Ethernet AVB network implementation as defined by IEEE 802.1Qat, and IEEE 1722, then an offset or delay between the audio and video streams due to the network 116 may be limited to two milliseconds.

The video stream receiver 108 may include a processing component 122 that introduces a processing delay in the video media stream 102. Examples of the processing component 122 include a video frame synchronizer, a video analytics processor for object segmentation, a video characterization processor for image statistics, a video resizer, a variable quality video encoder and/or decoder, or any other variable or constant delay processing component. The video frame synchronizer is a device that may synchronize a clock in the video stream receiver 108 with a clock in the display 112 and/or with a clock in the transmitter 106. The display 112 and the receiver 108 may share the same clock in some examples. Due to the processing of the frame synchronizer, the recovered video stream 118 received by the display 112 may be delayed by one to two video frames as compared to the recovered audio stream 120. The processing delay of one to two video frames introduced by the frame synchronizer may result in approximately a 30 millisecond to 60 millisecond offset between the recovered audio stream 118 and the recovered video stream 120 depending on the number of frames delayed.

The maximum allowable lead and lag times of an audio signal to a corresponding video signal is a subjective value. Humans are used to audio lagging video because such a lag matches the physical world and is better tolerated by humans. Conversely, audio leading video is much less tolerable to humans. One proposed acceptable delay range is plus 5 milliseconds to minus 15 milliseconds. In other words, the recovered audio stream 120 should not lead the recovered video stream 118 by more than 5 milliseconds, and should not lag the recovered video stream 118 by more than 15 milliseconds.

Consequently, if the processing component 122 in the video stream receiver 108 introduces a 30 millisecond to 60 millisecond processing delay as described above, then the recovered audio stream 120 may lead the recovered video stream 118 by more than the proposed acceptable lead time of 5 milliseconds.

In order to compensate for the processing delay, the video stream receiver 108 may transmit a content delay matching stream (CDMS) 124, designated CDMS 1 in FIG. 1, to the audio stream receiver 110 over the network 116. The CDMS 124 may be any stream of packets that includes an indication of the processing delay imposed on one or more of the media streams 102 and 104 or any other delay matching information for one or more of the media streams 102 and 104. For example, CDMS 1 may include an indication of the amount of processing delay introduced by the processing component 122 of the video stream receiver 108. A delay compensation component 128 in the audio stream receiver 110 may delay the audio media stream 104 based on the processing delay indicated in the CDMS 124, such as CDMS 1. Accordingly, the recovered audio stream 120 generated by the audio stream receiver 110 may be synchronized with the recovered video stream 118 generated by the video stream receiver 108 despite the processing delays caused by the processing component 122. Examples of the CDMS 124 include an IEEE 1722 stream, a multicast stream, a stream that conforms to a proprietary protocol, or any other streaming protocol. The CDMS 124 may include a continuous stream of packets. Alternatively or in addition, the CDMS 124 may include an intermittent stream of packets in which packets are transmitted when the processing delay changes.

The delay matching information may include any information from which a delay in the first media stream relative to the second media stream may be determined For example, the delay matching information may include an indication of a delay using time units, such as seconds, milliseconds, cycles of the real-time clock, and frames. The delay may include the processing delay. The processing delay may include any delay imposed on the media stream 102 or 104 by a hardware or software component. Alternatively or in addition, the delay may include a network delay. Thus, the delay matching information may include or exclude the network delay. The network delay may include any delay imposed on packets as the packets traverse the network 116. For example, the network delay may include a delay in transporting the packets of the media streams 102 and 104 over the network 116 from the transmitter 106 to the receivers 108 and 110. Alternatively or in addition, the network delay may include a delay in transmitting packets of the CDMS 124 over the network 116 from one device to another, such as from the video stream receiver 108 to the audio stream receiver 110.

The delay matching information may include a delay that is a relative delay because packets in the first media stream 102 may be related to packets in the second media stream 104. For example, a packet of the first media stream may be associated with a packet in the second media stream if the packets share a common timestamp or presentation time. Alternatively or in addition, the packets in the media streams 102 and 104 may be associated if the packets share some other indicator, such as a common stream identifier. The common stream identifier may include one of the stream identifiers, which identify the media streams 102 and 104. Alternatively or in addition, the common stream identifier may include an identifier different from the stream identifiers that identify the media streams 102 and 104. The sign, positive or negative, of the relative delay may indicate whether the first media stream 102 lags or leads the second media stream 104. Alternatively, the delay matching information may include a time delay that indicates how much time the processing component 122 is taking to process media samples without any explicit association, such as common timestamps, existing between the media streams 102 and 104.

In contrast to the relative delay, the delay matching information may include an absolute value. For example, the delay matching information may include a presentation time corresponding to the media sample that the video stream receiver 108 is currently generating as the recovered video stream 118. The audio stream receiver 110 may determine the relative delay by determining the difference between the presentation time included in the delay matching information and the presentation time corresponding to the media sample that the audio stream receiver 110 is currently generating as the recovered audio stream 120.

Alternatively or in addition, the delay matching information may be optimized in one example by including an offset from the last delay transmitted. The offset from the last delay transmitted may reduce the computational complexity of the delay calculation in some examples.

In some examples, the transmitter 106 may include the processing component 122 that introduces a processing delay to the video media stream 102 or to the audio media stream 104. Accordingly, the transmitter 106 may transmit a corresponding CDMS 126, designated CDMS 2 in FIG. 1, to one or more of the receivers 108 and 110. For example, the transmitter 106 may transmit CDMS 2 to the video stream receiver 108. The video stream receiver 108 may add or otherwise combine the delays introduced by the processing components 122 in the transmitter 106 and the video stream receiver 108 in order to determine a total amount of delay imposed on the video media stream 102. The video stream receiver 108 may transmit CDMS 1, which may include an indication of the total amount of delay imposed on the video media stream 102 by the processing components 122, to the audio stream receiver 110. Based on the delay matching information in CDMS 1, the delay compensation component 128 of the audio stream receiver 110 may delay the audio media stream 104 so that the recovered audio stream 120 and the recovered video stream 118 are synchronized. Alternatively or in addition, the delay compensation component 128 of the video stream receiver 108 may delay the video media stream 102. The indication of the processing delay in CDMS 1 and CDMS 2 may change dynamically when the processing delay imposed on the video media stream 102 changes. The amount of time that the receiver 108 or 110 delays the media stream 102 or 104 may change as the processing delay indicated in CDMS 1 and CDMS 2 changes.

The receiver 108 or 110 may determine an identity of the content delay matching stream (CDMS) 124 or 126 that the receiver 108 or 110 is to receive. For example, the receiver 108 or 110 may determine the identity of the CDMS 124 and 126 from advertising packets advertised by the video stream receiver 108, the transmitter 106, or both. The advertising packets may identify the CDMS 124 or 126 that corresponds to a particular one of the media streams 102 and 104. Any of the receivers 108 and 110 that receive any of the media streams 102 and 104 that are to be synchronized with the particular one of the media streams 102 and 104 may listen for advertising packets that identify the CDMS 124 or 126 corresponding to the particular media stream 102 or 104. The receiver 108 or 110 may subscribe to the CDMS 124 or 126 identified in the advertising packet. To subscribe to a stream, a request may be transmitted over the network 116 that identifies the stream to be received with a stream identifier (ID). In response, one or more devices may transmit the stream over the network 116 to the device that requested the stream. Alternatively or in addition, the receiver 108 or 110 may be manually configured by a user to subscribe to the appropriate CDMS 124 or 126.

Thus, while the audio stream receiver 110 is receiving the audio media stream 104, the audio stream receiver 110 may also be receiving the correct content delay matching stream (CDMS) 124 or 126. The delay compensation component 128 may use the content delay matching stream 124 or 126, such as CDMS 1, to insure that the audio delay in the audio media stream 108 matches the video delay in the video media stream 104. Consequently, the delay compensation component 128 may implement a "lip synching" feature by synchronizing the video media stream 102 and the audio media streams 104.

In addition, a logical link between, or a logical grouping of, the audio media stream 104 and the video media stream 102 may be formed. Alternatively or in addition, two or more receivers 108 may be logically linked for synchronization purposes. For example, the video stream receiver 108 may be logically linked with the audio stream receiver 110 so that the recovered video stream 118 and the recovered audio stream 120 are synchronized due to the media streams 102 and 104 being received by the receivers 102 and 104 identified in the logical link. In other words, the logical link may include an identification of the video stream receiver 108 and the the audio stream receiver 110, so that regardless of what media streams 102 and 104 are subscribed to by the video stream receiver 108 and the audio stream receiver 110, the audio stream receiver 110 will receive CDMS 1 from the video stream receiver 108 and the delay compensation component 128 adjusts the recovered audio stream 120 accordingly. In one example, the logical link between the receivers 108 and 110 may be formed at an application layer, and the implementation of the CDMS 124 and 126 may be in a layer 2 network protocol layer using an IEEE 1722 stream.

In one example, the logical link may be changed by modifying which receivers 108 and 110 are identified in the logical link or logical grouping. In a second example, the logical link may be changed by modifying which media streams 102 and 104 and content delay matching streams 124 and 126 are received. For example, the video stream receiver 108 and the audio stream receiver 110 may be reconfigured to receive a new video media stream and a new audio media stream from a new transmitter instead of receiving the video media stream 102 and audio media stream 104 from the transmitter 106 illustrated in FIG. 1. The audio stream receiver 110 may be reconfigured to receive a new content delay matching stream (CDMS) from the new transmitter instead of receiving CDMS 1 from the video stream receiver 108.

The receiver 108 or 110 may determine the identity of the CDMS 124 and 126 from the logical link instead of—or in addition to—from the advertising packets. For example, the logical link may identify the CDMS 124 and 126 that one or more of the receivers 108 or 110 identified in the logical link is to transmit and/or receive.

Figure 2:
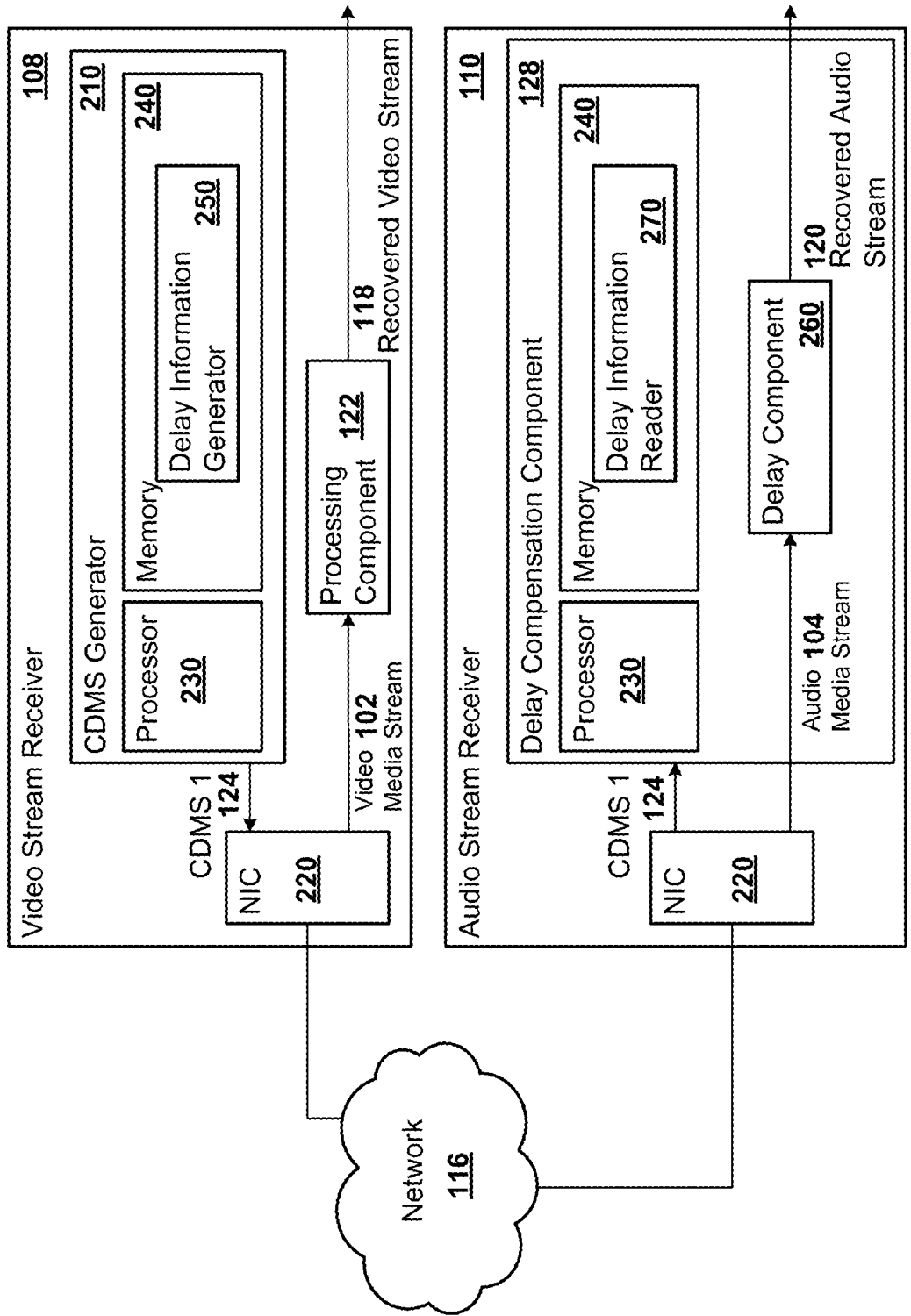
FIG. 2 illustrates a component diagram of example implementations of two receivers in a system for delay matching.

FIG. 2 illustrates a component diagram of example implementations of two receivers 108 and 110 in the system 100 for delay matching. The video stream receiver 108 may include a content delay matching stream (CDMS) generator 210, a network interface controller (NIC) 220, and the processing component 122. In contrast, the audio stream receiver 110 may include the delay compensation component 128 and a network interface controller 220 similar to the NIC 220 in the video stream receiver 108. The video stream receiver 108 and the audio stream receiver 110 may include additional, fewer, or different components. In a first example, the video stream receiver 108 and the audio stream receiver 110 may each include a data bus controller instead of the NIC 220, in a configuration where the network 116 comprises only a data bus over which the receivers 108 and 110 communicate with each other. Any of the receivers 108 or 110 may include a hardware controller, such as the NIC 220 or the data bus controller, to send and/or receive the media streams 102 and 104 and the content delay matching streams. The hardware controller may include hardware or a combination of hardware and software that enables communication over the network 116. In a second example, the audio stream receiver 110 and the video stream receiver 108 may each include both the CDMS generator 210 and the delay compensation component 128.

The network interface controller (NIC) 220 may include hardware or a combination of hardware and software that enables communication over the network 116. The NIC 220 may provide physical access to the network 116 and provide a low-level addressing system through use of, for example, Media Access Control (MAC) addresses. The NIC 220 may include a network card that is installed inside a computer or other device. Alternatively or in addition, the NIC 220 may include an embedded component as part of a circuit board, a computer mother board, a router, an expansion card, a printer interface, a USB (universal serial bus) device, or as part of any other hardware. In some examples, all or a portion of the CDMS generator 210 may be included in the network interface controller 210 instead of the network interface controller 210 and the CDMS generator 210 being physically discrete components. Alternatively or in addition, all or a portion of the delay compensation component 128 may be included in the NIC 210 instead of the NIC 210 and the delay compensation component 128 being physically discrete components.

The CDMS generator 210 may be any component that generates the CDMS 124, such as CDMS 1 or CDMS 2, based on the processing delay caused by the processing component 122. The CDMS generator 210 may include a processor 230 and a memory 240.

The memory 240 may be any data storage device or combination of data storage devices. The memory 240 may include non-volatile and/or volatile memory, such as a random access memory (RAM), a read-only memory (ROM), an erasable programmable read-only memory (EPROM), or flash memory. Alternatively or in addition, the memory 240 may include an optical, magnetic (hard-drive) or any other form of data storage device.

The processor 230 may be in communication with the memory 240 and the network interface controller 220. The processor 230 may also be in communication with additional components, such as the display 112. The processor 230 may include a general processor, a central processing unit of a computing device, a server device, an application specific integrated circuit (ASIC), a digital signal processor, a field programmable gate array (FPGA), a CPLD (complex programmable logic device), a digital circuit, an analog circuit, a microcontroller, or a combination thereof The processor 230 may include one or more elements operable to execute computer executable instructions or computer code embodied in the memory 240 or in other memory to perform features of the CDMS generator 210. Alternatively or in addition, the processor 130 may execute computer code to perform features of the video stream receiver 108.

The computer code may be written in any computer language, such as C++, C#, Java, Pascal, Visual Basic, Perl, HyperText Markup Language (HTML), JavaScript, assembly language, any other computer language, or any combination thereof For example, the computer code may include a delay information generator 250. The delay information generator 250 may determine the delay matching information that is included in the CDMS 124.

The delay compensation component 128 in the audio stream receiver 110 may delay the audio media stream 104 based on the processing delay indicated in the CDMS 124, such as CDMS 1. Alternatively or in addition, the video stream receiver 108 may include the delay compensation component 128 and, accordingly, delay the video media stream 104 if the video media stream 102 leads the audio video stream 104. The video stream receiver 108 may receive a content delay matching stream (CDMS) from the audio stream receiver 110 in order to determine that the video media stream 102 leads the audio video stream 104. Each of the receivers 108 and 110 may dynamically determine whether to delay the media stream 102 or 104 that the respective receiver 108 or 110 is recovering.

The delay compensation component 128 may include a processor 230 and a memory 240, such as the processor 230 and the memory 240 in the CDMS generator 210. In addition, the delay compensation component 128 may include a delay component 260 that delays the media stream 102 or 104 for a length of time indicated by the processor 230. Examples of the delay component 260 include a digital delay line, an audio synchronizer, or other device that may delay a signal for a variable amount of time. The delay component 260 may include all or a portion of a media interface as described in U.S. application Ser. No. 13/024,016, "MEDIA EXTRACTOR" filed Feb. 9, 2011. The media interface may generate the recovered media stream 118 or 120 on a per-media clock domain basis from the time-stamped packets of the media streams 102 and 104. The delay imposed by the media interface may vary depending on the length of time that the media interface buffers the media samples in the time-stamped packets. For example, the delay imposed by the media interface may be determined from a difference between a dynamic write pointer and a dynamic read pointer. The dynamic write pointer may identify a location in a buffer to write an incoming media sample. The dynamic write pointer may identify a location in the buffer from which to read a media sample that is to be included in the recovered media stream 118 or 120. The dynamic read pointer, for example, may be adjusted based on a real-time clock that identifies a current time that is synchronized with other nodes on the network 116, such as the transmitter 106. Alternatively or in addition, the dynamic read pointer may be adjusted based on the processing delay determined by the delay compensation component 128.

If the delay compensation component 128 and the CDMS generator 210 are included in the same receiver 108 or 110, then the delay compensation component 128 and the CDMS generator 210 may share the same processor 230 and the same memory 240. Thus, in some embodiments, all of the receivers 108 and 110 may include the same physical components so that any of the receivers 108 and 110 may operate as the first receiver receiving the first media stream.

The processor 230 of the delay compensation component 128 may be in communication with, for example, the speaker 114. The processor 230 of the delay compensation component 128 may execute computer code to perform the features of the delay compensation component 128. For example, the memory 240 of the delay compensation component 128 may include a delay information reader 270. The delay information reader 270 may extract the delay matching information from the CDMS 124. Accordingly, the delay compensation component 128 may direct the delay component 260 to delay the media stream 102 or 104 for the length of time indicated in the delay matching information extracted from the CDMS 124.

Alternatively or in addition, the memory 240 of the delay compensation component 128 and/or the CDMS generator 210 may include data structures. For example, the data structures may include the logical link between, or the logical grouping of, the receivers 108 and 110 and/or the media streams 102 and 104.

The system 100 may be implemented in many different ways. For example, although some features are shown stored in the computer-readable memory 240 (e.g., as logic implemented as computer-executable instructions or as data structures in memory), portions of the system 100 may be stored on, distributed across, or read from the memory 240 or some other machine-readable media. The computer-readable media may include RAM, an optical storage device, a magnetic storage device, a hard disk, a floppy disk, a CD-ROM, a solid state memory device, or any other form of tangible storage device. Alternatively or in addition, all or part of the CDMS generator 210 and the delay compensation component 128 may be implemented in one or more circuits or FPGAs.

In one example, the transmitter 106 may include the CDMS generator 210 and the processing component 122. If the transmitter 106 also operates as a receiver, the transmitter 106 may include the delay compensation component 128. For example, if the transmitter 106 re-transmits one or more of the media streams 102 and 104, then the transmitter 106 may include the delay compensation component 128.

Although FIGS. 1 and 2 describe the video media stream 102 and the audio media stream 104, the system 100 may operate on any type of media stream. Accordingly, the receivers 108 and 110 may be configured to receive any type of media stream. For example, the receivers 108 and 110 may comprise two video stream receivers. The media streams 102 and 104 may include two video media streams. In a second example, the receivers 108 and 110 may comprise two audio receivers. The media streams 102 and 104 may include two audio media streams. Alternatively or in addition, the media streams 102 and 104 may include multi-channel audio, such as surround sound channels.

The components of the system 100 may include additional, fewer, or different components than illustrated in FIGS. 1 and 2. For example, the memory 240 of the delay compensation component 128 may include modules in addition to the delay information reader 270.

The processing capability of the system 100 may be distributed among multiple entities or nodes, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may implement the features of the delay information reader 270.

The term "module" or component may refer to one or more executable modules. As described herein, the modules, such as the delay information generator 250 and the delay information reader 270, may include software, hardware or some combination thereof executable by the processor 230. Software modules may include instructions stored in the memory 240, or other memory device, that are executable by the processor 230 or other processor. Hardware modules may include various devices, components, circuits, gates, circuit boards, and the like that are executable, directed, and/or controlled for performance by the processor 230.

In one example, one of the receivers 108 or 110 may receive multiple content delay matching streams 124 from multiple receivers 108 and 110, multiple transmitters 106, or a combination thereof The delay compensation component 122 of the receiver 108 or 110 may determine an appropriate delay for the media stream 102 or 104 from the delay matching information received in the multiple content delay matching streams 124. For example, the receiver 108 or 110 may determine the delay as the maximum delay indicated in multiple content delay matching streams 124 received by the receiver 108 or 110. Accordingly, in the example illustrated in FIG. 1, the audio stream receiver 110 may receive CDMS 1 and CDMS 2 and determine the appropriate delay from the two instead of the video stream receiver 108 receiving CDMS 2 and including the appropriate delay in CDMS 1. Furthermore, the delay compensation component 122 of the receiver 108 or 110 may determine the delay as the maximum delay indicated in the multiple content delay matching streams 124 minus the delay imposed by the processing component 122 that processes the media stream 102 or 104 recovered by the receiver 108 or 110.

In a second example, the receivers 108 and 110 may be in communication with each other only over the network 116. Therefore, a traditional audio synchronizer may not be able to synchronize the audio media stream 104 with the video media stream 102.

Figure 3:
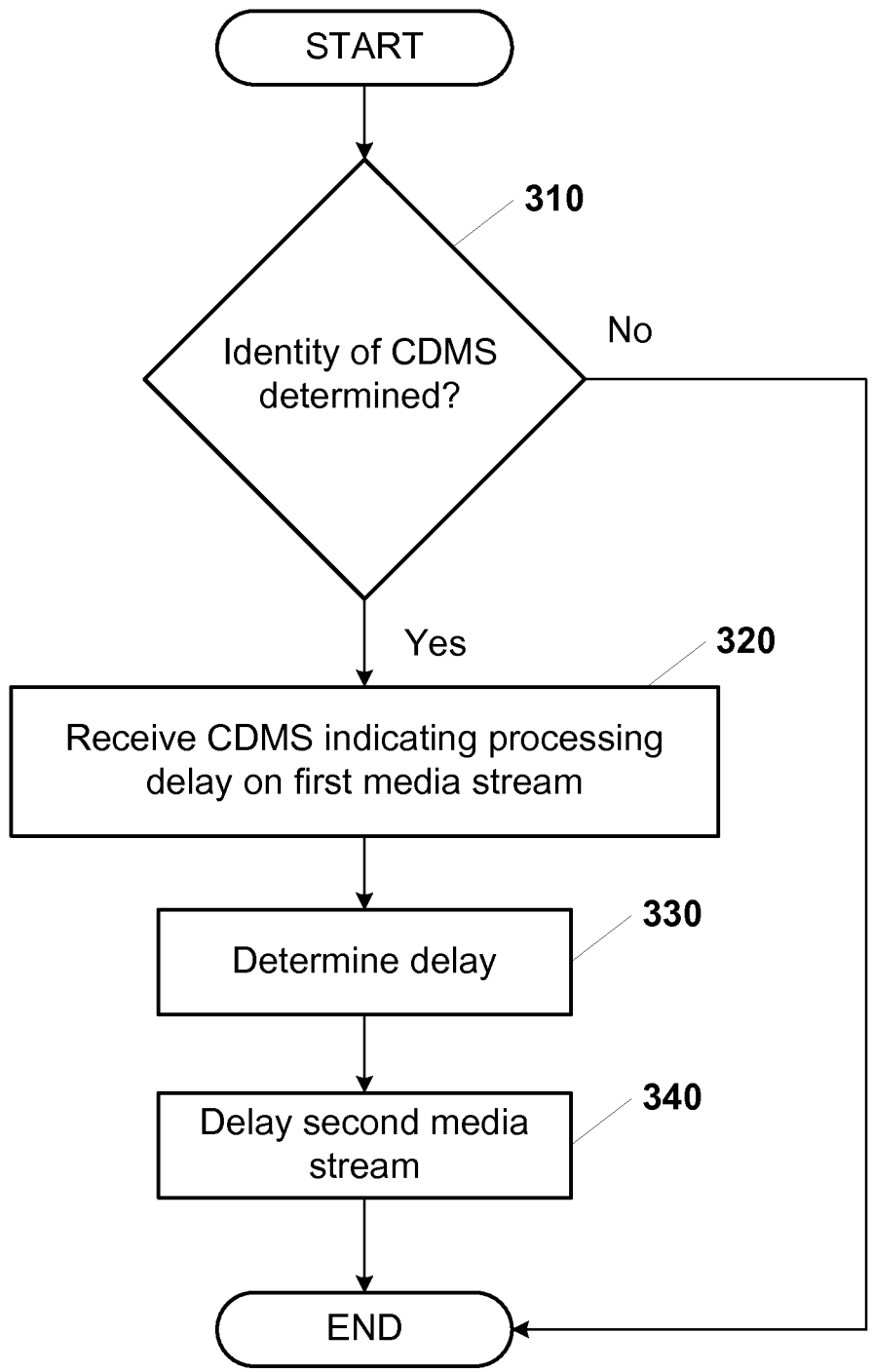
FIG. 3 illustrates an example flow diagram of the logic of using a content delay matching stream to synchronize a first media stream and a second media stream.

FIG. 3 illustrates an example flow diagram of the logic of using the content delay matching stream 124 or 126 to synchronize a first media stream and a second media stream, such as the video media stream 102 and the audio media stream 104. The operations may be executed in a different order than illustrated in FIG. 3. The logic may include additional, different, or fewer operations than illustrated in FIG. 3.

The logic may begin with an identity of the content delay matching stream 124 or 126 being determined (310). The content delay matching stream 124 may include data indicative of a processing delay imposed on the first media stream 102 or 104 by the processing component 122 that processes the first media stream 102 or 104. For example, the processing component 122 may be included in the first receiver 108 or 110.

If the identity of the CDMS 124 or 126 is not determined, then the logic may end by, for example, re-attempting to identify the CDMS 124 or 126. Alternatively, if the identity of the CDMS 124 or 126 is determined, then the logic may continue with the identified content delay matching stream 124 or 126 being received (320) over the network 116 at the second receiver 108 or 110. The processing delay may be determined (330) from the CDMS 124 or 126. Accordingly, the logic may continue with the second media stream 102 or 104 being delayed (340) at the second receiver 108 or 110 based on the processing delay. The logic may end by, for example, continuing to receive the CDMS 124 or 126 and delaying the second media stream 102 or 104 as indicated by the CDMS 124 or 126.

Although specific components of innovations were described, methods, systems, and articles of manufacture consistent with the innovation may include additional or different components. For example, memories may be DRAM, SRAM, Flash or any other type of memory. Flags, data, tables, entities, and other data structures may be separately stored and managed, may be incorporated into a single memory or database, may be distributed, or may be logically and physically organized in many different ways. The components may be included on non-transitory computer readable media encoded with computer readable instructions. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The non-transitory computer readable media may include various types of volatile and nonvolatile storage media, such as RAM, flash drives, CD-ROMs, or other storage media. The functions, acts or tasks illustrated in the figures or described above may be executed in response to one or more sets of logic or instructions stored in or on computer readable media. The functions, acts or tasks are independent of the particular type of instructions set, storage media, processor or processing strategy, and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

The term "audio/video" may mean audio, video, or both. Thus, in one example, "audio/video" means only audio. In a second example, "audio/video" means only video. In a third example, "audio/video" means a combination of audio and video.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A system for matching a delay between a first media stream and a second media stream, the system comprising:
    a first receiver configured to receive the first media stream from a transmitter over a network, where the network includes a packet-switched network; and
    a second receiver configured to receive the second media stream from the transmitter over the network and to determine an identity of a content delay matching stream based on the identity of the second media stream, the content delay matching stream comprising a stream of packets, the content delay matching stream comprising data indicative of a processing delay in the first media stream, the processing delay introduced by a processing component of at least one of the first receiver and the transmitter, where the second receiver is further configured to:
        receive the content delay matching stream over the network based on the identity of the content delay matching stream, where the content delay matching stream is received separately from the first media stream and the second media stream, and where the content delay matching stream is transmitted from the first receiver to the second receiver over the network;
        determine the processing delay from the content delay matching stream; and
        cause the second media stream to be delayed in accordance with the processing delay in the first media stream.

2. The system of claim 1, where the first receiver is a discrete device physically separate from the second receiver, the first receiver in communication with the second receiver only over the network.

3. The system of claim 1, where the content delay matching stream comprises a plurality of delay values, which vary over time.

4. The system of claim 1, where the second receiver is configured to determine the identity of the content delay matching stream from a logical grouping of the first receiver and the second receiver.

5. A tangible non-transitory computer readable medium encoded with computer executable instructions for synchronizing a first media stream received over a network by a first receiver and a second media stream received over the network by a second receiver, the computer executable instructions executable with a processor, the tangible non-transitory computer readable medium comprising:

instructions executable to determine an identity of a content delay matching stream, the content delay matching stream comprising data indicative of a processing delay imposed on the first media stream by a processing component, and the content delay matching stream is received over the network separately from both the first media stream and the second media stream, where the network transports packets, and the content delay matching stream comprises a stream of packets;

instructions executable to receive the content delay matching stream over the network at the second receiver based on the identity of the content delay matching stream, the content delay matching stream being received from the first receiver over the network;

instructions executable to determine the processing delay from the content delay matching stream; and instructions executable to delay the second media stream at the second receiver based on the processing delay.

6. The computer readable medium of claim 5, where the instructions executable to determine the identity of the content delay matching stream are executable to determine the identity from an association of the identity with an identity of the first media stream in a memory.

7. The computer readable medium of claim 5, where the content delay matching stream comprises real-time delay matching information for a plurality of media streams including the first media stream.

8. The computer readable medium of claim 5, where the instructions executable to delay the second media stream are executable to delay the second media stream based on the processing delay and a network delay.

9. The computer readable medium of claim 5, where the instructions executable to receive the content delay matching stream comprise instructions executable to subscribe to the content delay matching stream with the identity of the content delay matching stream.

10. The computer readable medium of claim 5, where the content delay matching stream includes an intermittent stream of packets in which the packets are transmitted when the processing delay changes.

11. The computer readable medium of claim 5, where the instructions executable to delay the second media stream are executable to delay the second media stream for at least the processing delay and a network delay between the first receiver and the second receiver.

12. A method for matching a delay between a first media stream received over a network by a first receiver and a second media stream received over the network by a second receiver, the method comprising:

determining an identity of a content delay matching stream with a processor, the content delay matching stream comprising data indicative of a processing delay imposed on a first media stream by a processing component of at least one of the first receiver and transmitter of at least one of the first and second media streams;

receiving the content delay matching stream from the first receiver and separately from the second media stream over the network at the second receiver with the processor in response to a determination of the identity of the content delay matching stream, where the network transports packets, and the content delay matching stream comprises a stream of packets;

determining the processing delay with the processor from the content delay matching stream; and delaying the second media stream at the second receiver based on the processing delay.

13. The method of claim 12, where the content delay matching stream comprises data indicative of a processing delay imposed by a transmitter that transmits the first media stream to the first receiver.

14. The method of claim 13, further comprising receiving a second content delay matching stream from the transmitter at the first receiver, the second content delay matching stream including the data indicative of the processing delay imposed by the transmitter.

15. The method of claim 12, further comprising receiving a different content delay matching stream than the content delay matching stream in response to receiving a different media stream than the first media stream at the first receiver.

16. An apparatus for synchronizing a first media stream received over a network by a receiver and a second media stream received over the network by the apparatus, the apparatus comprising:

a delay compensation component configured to determine an identity of a content delay matching stream, the content delay matching stream comprising a stream of packets that comprise data indicative of a processing delay imposed on the first media stream by a processing component;

a hardware controller configured to receive the content delay matching stream separately from the second media stream over the network based on the identity of the content delay matching stream, where the network is packet based;

a delay information reader configured to determine the processing delay from the content delay matching stream; and a delay component configured to delay the second media stream based on the processing delay.

17. The system of claim 1, wherein the content delay matching stream is a first content delay matching stream, and wherein the first receiver receives a second content delay matching stream from the transmitter.

18. The system of claim 17, wherein the second content delay matching stream includes an indication of delays introduced by one or more processing components in the transmitter, and wherein the first content delay matching stream includes a combination of delays introduced by the one or more processing components in the transmitter and delays introduced by one or more processing components in the first receiver.

19. The system of claim 1, wherein the content delay matching stream includes an indication of processing delays introduced by one or more processing components of the first receiver.

* * * * *